United States Patent [19]
Barber

[11] 3,889,602
[45] June 17, 1975

[54] METHOD AND APPARATUS FOR TRANSPORTING

[76] Inventor: Gerald L. Barber, 309 Cardinal Dr., Taylor, S.C. 29687

[22] Filed: Mar. 13, 1974

[21] Appl. No.: 450,591

[52] U.S. Cl............... 104/23 FS; 104/134; 104/155
[51] Int. Cl.............................................. B61b 13/08
[58] Field of Search........ 104/23 FS, 134, 147, 155, 104/154

[56] References Cited
UNITED STATES PATENTS

| | | | |
|---|---|---|---|
| 3,273,727 | 9/1966 | Rogers............... | 104/23 FS |
| 3,580,181 | 5/1971 | Bertin............... | 104/23 FS |
| 3,586,382 | 6/1971 | Pitkanen........... | 104/23 FS |
| 3,788,231 | 1/1974 | Bloomfield........ | 104/23 FS |

*Primary Examiner*—M. Henson Wood, Jr.
*Assistant Examiner*—D. W. Keen
*Attorney, Agent, or Firm*—Melvin A. Crosby

[57] ABSTRACT

A method and apparatus for transporting in which a track is provided on which vehicles can run with the track including at least one conduit which is supplied with air pressure and having valves therein which are opened by a vehicle moving along the track. The vehicle confines a space with the track to which compressed air from the opened valves is supplied thereby providing lift for the vehicle. The pressurized space beneath the vehicle is also connected by a duct in the vehicle with an opening at the rear of the vehicle so that air will also flow out the rearward opening and provide forward propulsion force on the vehicle.

18 Claims, 12 Drawing Figures

PATENTED JUN 17 1975  3,889,602

SHEET 1

METHOD AND APPARATUS FOR TRANSPORTING

The present invention relates to a method and apparatus for transporting and is particularly concerned with such a method and apparatus wherein the forces acting on the vehicle are all derived from compressed air.

Compressed air for use in providing lift for vehicles is known, such vehicles being referred to as "air-cushion" arrangements and the like. All of the vehicles operate on the principle of confining a space beneath the vehicle and supplying air under pressure thereto and which will develop lifting force on the vehicle. Since available area is usually quite large, the air pressure in the space can be rather low while still obtaining the necessary lifting effect.

The advantage of supporting a vehicle on an air-cushion is that substantially all friction in respect of the support is eliminated and the vehicle can be propelled with a relatively small propulsive force. Heretofore, the application of air-cusions of the nature referred to above have generally been confined to road vehicles and water vehicles and the like.

The present invention proposes the provision of an apparatus or system in which vehicles are supported on an air-cushion while simultaneously being propelled by an air jet arrangement in which the vehicles are confined to a track arrangement. With the vehicles confined to a track arrangement, many problems are eliminated in respect of guiding the vehicles and, also, inexpensive installations can be made for transporting personnel as well as goods between predetermined points.

A further object of the invention is the provision of a system of the nature referred to which is quite inexpensive and which has wide utility, being applicable to cargo or goods as well as personnel.

Another object is the provision of a system or arrangement of the nature referred to which is substantially self-stabilizing thereby requiring the minimum in the way of guide means and safety devices.

A still further object is the provision of a system or arrangement of the nature referred to in which the entire motive power for supporting and propelling the vehicle is obtained from compressed air generated externally of the vehicle.

A still further object is the provision of a system of the nature referred to in which the vehicle construction is extremely simple and inexpensive.

BRIEF SUMMARY OF THE INVENTION

According to the present invention, a track arrangement is provided extending between two points between which cargo or personnel are to be transported. At least one vehicle is provided for running on the track between the aforementioned points. The track is characterized in the provision of one or more conduits extending longitudinally therealong and supplied with air under pressure by one or more bellows connected thereto. The conduit has normally closed valves therein which are opened by the vehicle passing thereover.

The valves, when opened, communicate with a space confined by the vehicle and the track so that lift is developed on the vehicle by the air under pressure therebeneath. The pressurized space beneath the vehicle communicates with a conduit or duct extending longitudinally of the vehicle and terminating in a nozzle arrangement at the rear end of the vehicle so that the compressed air will jet rearwardly from the vehicle and develop propulsive force thereon in the forward direction. The nozzle may have louvers or the like therein to adjust the effective area thereof thereby to control the propulsive force.

In one modification, a single conduit is centrally located in the track and the duct in the vehicle opens downwardly and has side walls running along the sides of the conduit so that the top of the conduit forms the bottom of the duct. Compressed air in the duct flows laterally to regions beneath the vehicle on opposite sides of the conduit and also flows rearwardly to the nozzle at the rear end of the duct.

In this arrangement, two rows of valves are provided on the top of the conduit along opposite sides and two valve actuating members are carried on the vehicle with a divider plate disposed beneath the valve actuating members. In this manner, lateral tilting of the vehicle automatically adjusts the air flow from the respective rows of valves to create restoring forces tending to hold the vehicle in a level position.

In another modification of the invention, two pressurized conduits are provided with one being disposed at each side edge of the track. Each conduit has valves along the top which are opened by the vehicle and there is a plate on the track extending between the conduits and a plate on the vehicle extending between the cams and confining the space which is pressurized by air coming out the opened valves.

In this last mentioned modification, the conduits also have valves on the outer sides and the vehicle has further cams for opening the valves in the side of the track. These further valves supply air which tends to stabilize the vehicle in the lateral direction and which also supplies pipes extending transversely of the vehicle at the front and back ends with the pipes having nozzles directed angularly downwardly and toward the center of the vehicle. These pipes create air curtains under pressure which tend to pair the opposite ends of the space between the aforementioned plates thereby making efficient use of the compressed air supplied to the space.

As in connection with the first mentioned modification, a longitudinal duct in the vehicle communicates with the pressurized space therebeneath and with a rearward nozzle in the vehicle so that air jetting from the nozzle will provide forward propulsive force on the vehicle in the forward direction.

These and other objects and advantages of the present invention will become more apparent upon reference to the following detailed specification taken in connection with the accompanying drawings in which.

DETAILED DESCRIPTION OF THE INVENTION

Figure 1:
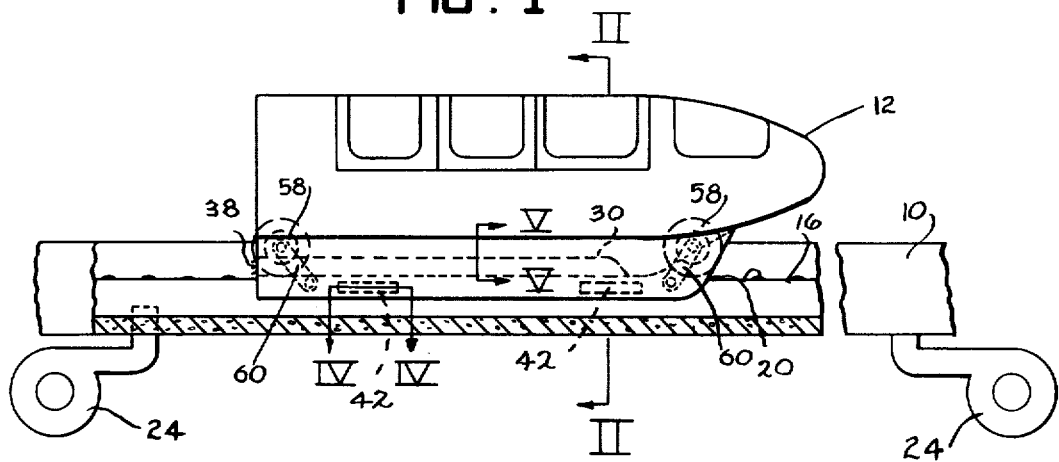
FIG. 1 is a schematic view showing one form of the invention.
Figure 2:
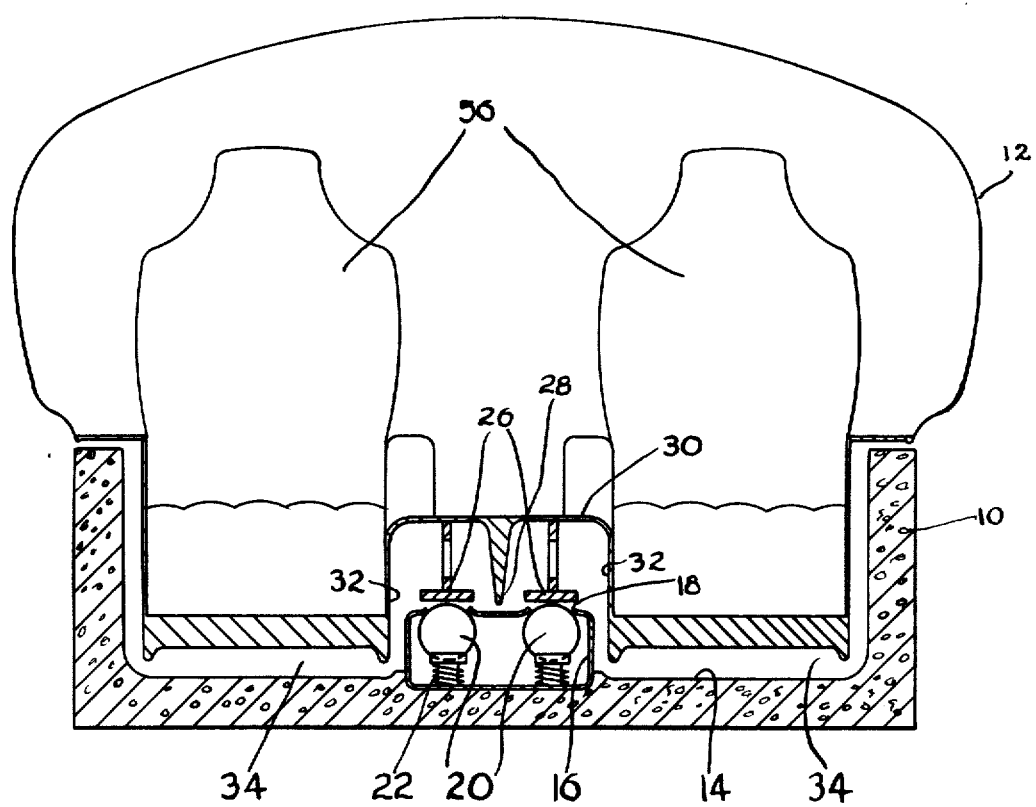
FIG. 2 is a transverse sectional view indicated by line II—II on FIG. 1.

Referring to the drawings somewhat more in detail, in FIGS. 1 and 2, the track comprises a generally U-shaped structure 10 which may be formed of concrete or the like and defining a generally upwardly opening track or channel along which a vehicle 12 is adapted to move. In about the center of the upwardly facing bottom wall 14 of the track is a conduit 16 having two rows of holes 18 distributed therealong.

Inside the conduit is a valve member 20 for each hole, each valve member being in the form of a ball and being biased toward seating engagement with the respective hole by a spring 22. The conduit 18 is supplied with air under pressure as by blower means 24 with air escaping only when a valve is opened.

Each valve member protrudes upwardly beyond the top of conduit 16 and is adapted for actuation into open position by a respective one of the elongated valve actuating members 26 which are in the form of rails. The rails will thus engage the balls 20 and actuate those valves into open position which are beneath the vehicle.

As will be seen in FIG. 2, there are two laterally spaced rows of valves with a rail 26 pertaining to each row while interposed between the rails is a baffle member 28 which more or less isolates one row of valves from the other.

The baffle member 28 and rails 26 project downwardly from the top wall of a downwardly opening duct 30 which extends longitudinally of the vehicle and which has side walls 32 disposed relatively close to the sides of conduit 16. To each side of conduit 16 there is a region 34 beneath the vehicle which receives air from duct 30 when valve members 20 are pressed downwardly by the vehicle.

The air supplied to regions 34 in addition to air in duct 30 supplies lift force to the vehicle which will elevate the vehicle upwardly, the valve members 20 moving toward closed position as the vehicle lifts whereby an automatic balance is obtained.

Figure 3:
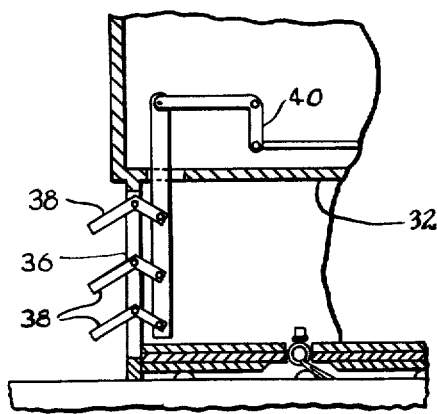
FIG. 3 is a fragmentary view showing the nozzle at the rear of the longitudinal duct in the vehicle.

As will be seen in FIG. 3, the rearward end of duct 30 terminates in a nozzle 36, the effective area of which is adapted for being controlled by adjustable louvers 38 so that the forward propulsive force exerted on the vehicle by the jet issuing from nozzle 36 can be adjusted. The louvers can be adjusted as by the linkage 40 schematically illustrated in FIG. 3.

Figure 4:
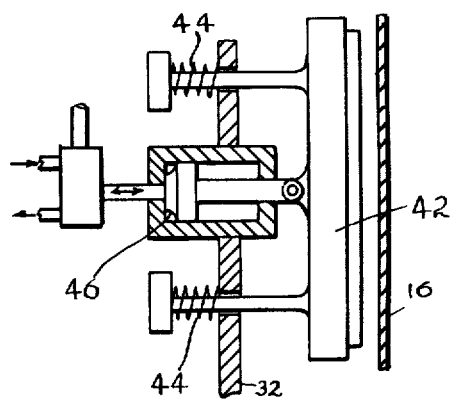
FIG. 4 is a plan section indicated by line IV—IV on FIG. 1 showing a brake shoe forming a part of the structure.

Carried on the vehicle at the sides of duct 16 are brake shoes, one of which is shown at 42 in FIG. 4. These brake shoes are spring biased by springs 44 toward retracted position but are adapted for being moved inwardly against the side walls of the duct by a supply of fluid to piston and cylinder means 46. The piston and cylinder means 46 can be actuated by air under pressure derived from duct 30 and provides the means for bringing the vehicle to a halt and for holding it in halted position. Advantageously, there is at least one brake shoe on each side of the vehicle and preferably two or more on each side of the vehicle.

Figure 5:
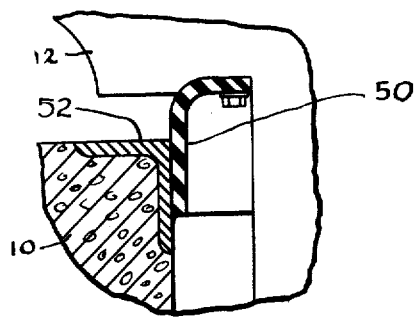
FIG. 5 is a fragmentary view indicated by line V—V on FIG. 1 showing one form which a seal can take between the side of the vehicle and the track.
Figure 6:
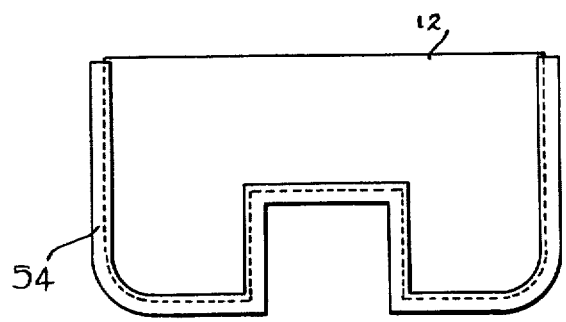
FIG. 6 is a view looking in at the end of the vehicle and showing a mechanical seal that could be used at either end of the vehicle.

The space between each side of the vehicle and the upper open end of track 10 can be sealed as shown in FIG. 5 as by a resilient strip 50 secured to the vehicle and slidable along the inside of the side wall of the track. Advantageously, a metallic insert 52 is provided in the track to reduce friction between the seal element 50 and the track thereby to reduce wear of the seal element.

Figure 7:
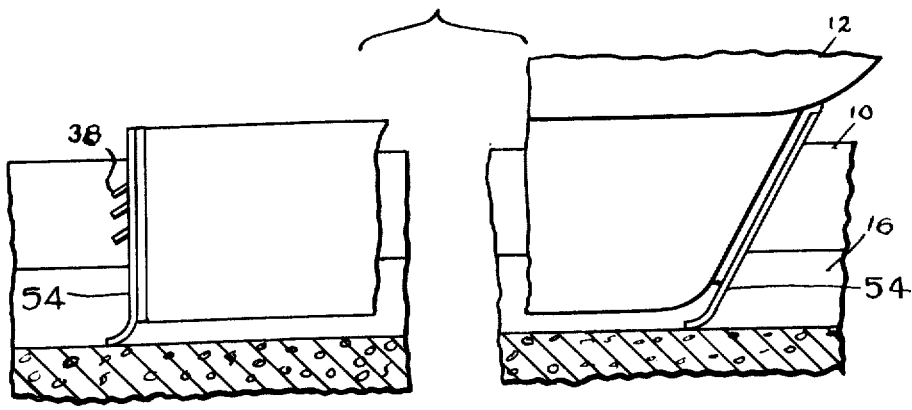
FIG. 7 is a schematic view partly broken away showing a seal arrangement at opposite ends of the vehicle.

The opposite ends of the vehicle can be substantially sealed to track 10 as by resilient seal member 54 shown in FIG. 7 and of which there is one on each of the front and rear sides of the vehicle as shown in FIG. 7. With the space confined between the vehicle and the track substantially sealed at the front and back and sides of the vehicle, highly efficient use of the compressed air is made and little power is lost in maintaining the conduit 16 under pressure.

As will be seen in FIG. 2, which is a schematic representation of a passenger compartment, the vehicle could comprise two rows of seats 56 and could have other auxiliaries mounted therein if so desired such as a generator driven by an air motor driving motive air from duct 30 and could, likewise, be provided with other auxiliaries powered by compressed air from the space beneath the vehicle.

The vehicle may be provided with ground wheels indicated at 58 in FIG. 1 with the ground wheels being mounted on swingable arms 60 so that when the vehicle is on the track 10 the wheels can be retracted while, when the vehicle is removed from the track, the wheels 58 are swung down for supporting the vehicle and for movement thereof to any desired location. The vehicle could be removed from the track in order to service the vehicle or to replace the vehicle by a cargo vehicle.

Figure 8:
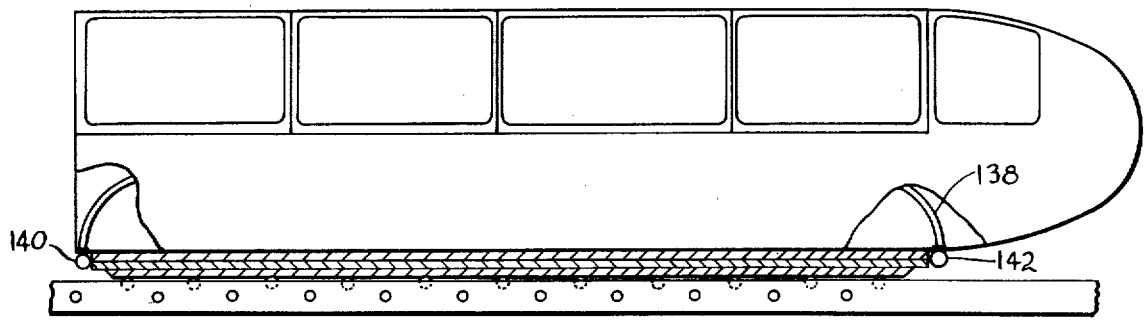
FIG. 8 shows a schematic side view of a modification.
Figure 9:
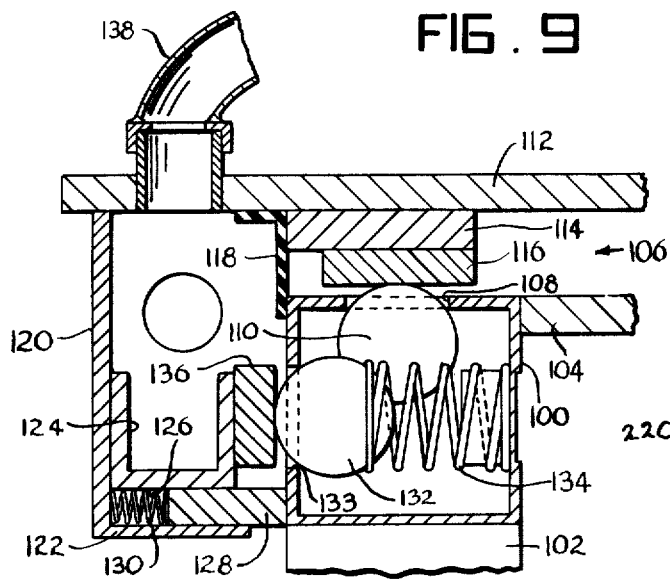
FIG. 9 is a view looking in at the rear of the vehicle and track.

FIGS. 8 and 9 show a modified arrangement in which the conduit means that are supplied with air under pressure comprise a pair of conduits 100 one extending along each side of the track means and supported by members 102 which may be concrete supports or the like. A plate 104 extends laterally between the conduits 100 and is connected thereto and forms the bottom of the space 106 which is to be pressurized for supplying lift force to the vehicle.

As in connection with the first modification, a plurality of apertures 108 are provided in the top of each conduit 100 and each is normally closed by a valve member in the form of a ball 100 spring urged in the upward direction and when seated in the respective aperture 108 protruding upwardly above the top of the conduit.

The vehicle in the modification of FIGS. 8 and 9 has a continuous bottom plate 112 which forms the top for space 106. Extending longitudinally beneath plate 112 at each side is a metal strip 114 and on the bottom of metal strip 114 is a strip 116 forming a cam for actuating the valve members. This cam advantageously has tapered ends and is substantially linear between the ends.

A flexible seal strip 118 is provided attached to the bottom of the plate 112 and extends downwardly and sealingly engages the upper outer corner region of the respective conduit 100.

Plate 112 extends outwardly beyond seal strip 118 and has dependent therefrom a metal plate 120 which at the bottom has a flange 122 extending inwardly toward conduit 100. A U-shaped channel member 124 mounted on the inside of plate 120 defines a slot 126 with flange 122 in which is mounted a sealing strip 128 which may be, for example, a high density polyethylene member. This strip is urged by spring means 130 toward conduit 100 and sealingly engages the lower outside corner region of the conduit.

Each conduit 100 is also provided with apertures 132 in the outer wall closed by respective valve members 132 in the form of balls which are spring urged as by springs 134 toward closing position. As in connection with the other valve members, when balls 132 are in closed position, they protrude outwardly from the respective side wall of the conduit.

The leg of channel 124 nearest conduit 100 carries a cam strip 136 which is similar to the cam strip 116 previously described and which may also consist of high density polyethylene. This strip serves to actuate the valve members 132 into open postion when the vehicle is within range of the valve members while, furthermore, serving as a skid pad to engage the side wall of conduit 100 if the vehicle shifts laterally beyond a certain predetermined amount.

The chamber with which the valves in the side of the conduit communicate is connected to a hose or similar conduit at 138 and which leads to a pipe 140 extending transversely at the end of the vehicle. Advantageously, both sides of the vehicle are constructed the same, and there is, thus, a conduit 138 taken off from each side of the vehicle with one running to a pipe 140 at the back of the vehicle and the other running to a pipe 142 at the front of the vehicle.

Figure 10:
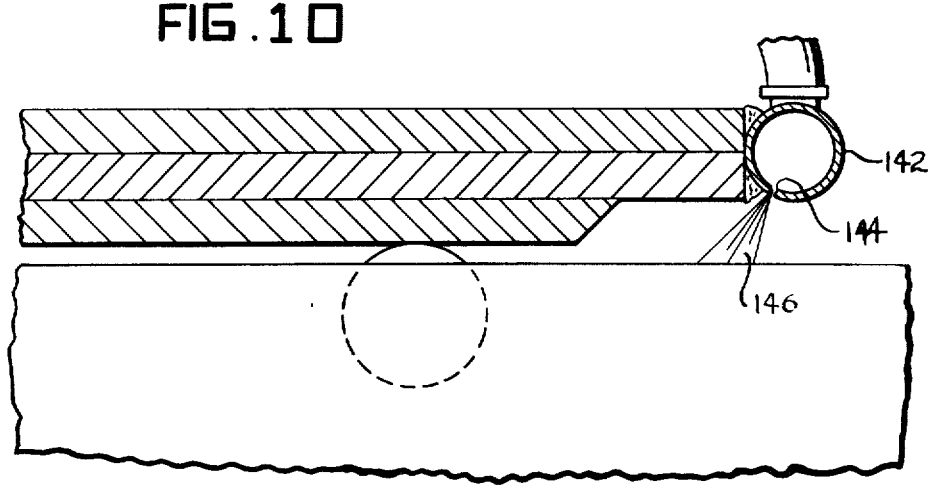
FIG. 10 is a fragmentary sectional view showing how the ends of the space between the vehicle and track structure could be provided with a sealing air current.

Each of these pipes is arranged as shown in FIG. 10 with nozzle openings 144 therein directed downwardly and toward the longitudinal center of the vehicle so as to establish a pressurized air curtain, indicated at 146 which forms a seal which at each of the front and rear ends of space 106 between plates 104 and 112.

The pipes 140 and 142 preferably extend the full width of plate 104 plus the width of the two conduits 100 and for sealing at the ends of the chambers between the plates 120 and the sides of conduits 100 there may be similar jet pipes provided at the fore and aft ends of the chamber and which jet pipes, it will be obvious, will be considerably shorter than pipes 140 and 142.

In each of the modifications illustrated, it will be evident that the opening of the valves provided the compressed air is reached will vary in the degree of opening in direct conformity with the elevated position of the vehicle. Thus, if the vehicle is set completely down, the valves are wide open and will gradually close as the vehicle is lifted upwardly thereby providing for a self-balancing action.

Similarly, the valves at the sides of conduits 100 operate in the same manner to stabilize the vehicle in the lateral direction.

As in the case of the first modification, the vehicle of the modification of FIGS. 8 to 10 can be provided with a longitudinal duct communicating with space 106 and having a nozzle at the rear end of the vehicle so that a rearwardly directed jet is formed at the rear of the vehicle to provide forward propulsive force.

Braking means could also be provided in connection with the vehicle of the modification of FIGS. 8 to 10 by availing of the space between plates 104 and 112 or by providing brake shoes on the vehicle adapted to be pressed into frictional engagement with plate 104.

Figure 11:
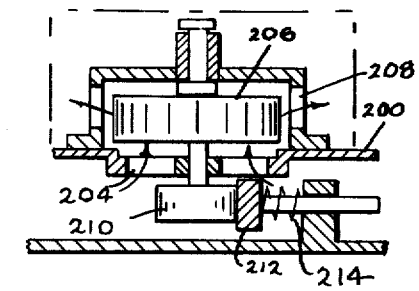
FIG. 11 is a fragmentary view showing a turbine member actuating a drive wheel for imparting forward propulsive force to the vehicle.

In FIG. 11, the bottom plate 200 of the vehicle is provided with aperture means 204 forming the inlet for an air driven rotor 206 which discharges air via ports 208 into the longitudinal conduit in the vehicle. Rotor 206 drives a friction wheel 210 that engages a longitudinal track element 212 spring biased toward the roller as by spring means 214.

Track element 212 is preferably jointed in longitudinally spaced regions so that the track element will conform to the roller as the vehicle shifts laterally. The space directly beneath the vehicle is pressurized and by the provision of the turbine propulsive force can be developed on the vehicle in addition to or exclusively of jets at the back of the vehicle.

The turbine could also be employed for driving a compressor to supply compressed air to jets at the back of the vehicle and the same turbine, or a like turbine, could be employed for driving a generator or air conditioning means or the like.

Figure 12:
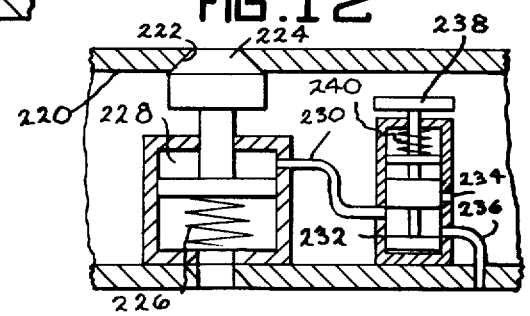
FIG. 12 is a fragmentary view showing a magnetically operated valve arrangement.

FIG. 12 shows the air pressure conduit 220 having apertures 222 therein closed by valve members 224. Each valve member is biased toward closed position by spring 226 and is adapted to open upon the supply of pressure to area 228 and which is connected by conduit 230 with a valve 232 having a pressure inlet 234 and an exhaust connection 236.

A magnet 238 on the upper end of the valve member of valve 232 is adapted to respond to a magnet carried on the bottom of the vehicle so that, as the vehicle passes over valve 232, the valve member thereof will move upwardly against the bias of spring 240 and admit pressure from pressure inlet 234 to conduit 230 and thence to area 238 and move valve member 234 downwardly. After the vehicle has departed, the valve member 232 moves downwardly and conduit 230 will be connected to exhaust conduit 236 and valve 234 will again move to closed position.

Modifications may be made within the scope of the appended claims.

What is claimed is:

1. In a transporting apparatus; track means, conduit means extending longitudinally along the track means in about the center thereof and adapted to be supplied with air under pressure, valve means distributed along the length of said conduit means in laterally spaced rows and normally closed, a vehicle adapted to run along said track means and to confine therewith a space with which said valves communicate and with a downwardly facing surface of the vehicle closing the top of said space, laterally spaced valve actuating means on the vehicle for opening the valve means of the respective rows which are within the longitudinal range of said space whereby compressed air in said conduit means flows into said space and supplies lifting force to the vehicle, means in said space restricting lateral flow of air therein between said rows of valve means, passage means in the vehicle leading out the rear end thereof from said space whereby compressed air in said space flows through said passage means and supplies rearwardly directed air jet means to exert propulsive force on the vehicle in the forward direction, and means for supplying air under pressure to said conduit means.

2. A transporting apparatus according to claim 1 in which each said valve means comprises a hole in the conduit means and a valve member in the conduit means spring urged toward seating engagement with the hole, each valve member protruding through the hole for engagement by the said valve actuating means on the vehicle.

3. A transporting apparatus according to claim 2 in which each valve member is a ball.

4. A transporting apparatus according to claim 1 in which said conduit means comprises a single conduit centrally located on said track means and protruding upwardly therein, said space comprising a region beneath the vehicle on each side of said conduit, and a central duct extending longitudinally of the vehicle open toward said conduit and having side walls adjacent the sides of the conduit, said valve actuating means protruding downwardly in said central duct, said means restricting lateral flow between said rows of valves comprising a longitudinal rib dependent from the vehicle between said valve actuating means.

5. A transporting apparatus according to claim 4 in which said valve means comprise two rows of laterally aligned valves in the top of said conduit, a valve actuating member in said duct for the valves of each row, and flow restricting means on the vehicle between the rows of valves, said side walls of said duct and the sides of said conduit forming restricted passages between each said region and the row of valves adjacent thereto.

6. A transporting apparatus according to claim 5 in which said passage means in the vehicle is formed by said duct.

7. A transporting apparatus according to claim 1 in which said conduit means comprise a pair of laterally spaced parallel conduits, a closure plate extending between said conduits and forming the bottom of said space, said valve means comprising a row of valves in each conduit having valve members protruding from the conduit in closed position, said vehicle having runner-like cams thereon adjacent each conduit for actuating the valves into open position when the vehicle is positioned over the respective region of the conduits, and a plate on the bottom of the vehicle extending between said cams and forming the top closure for said space.

8. A transporting apparatus according to claim 7 in which said valve members protrude upwardly from the top of the conduits, said runner-like cams being in the bottom of the vehicle, whereby said valve means vary in the degree of opening by the cams inversely to the degree the vehicle is elevated by the air from the valves.

9. A transporting apparatus according to claim 7 which includes further valves in the side of each conduit including further valve members protruding laterally from each conduit, said vehicle comprising further laterally directed runner-like cams for engaging and opening said further valve members on the vehicle passes thereby, lateral chambers receiving the air from said further valve means, and nozzles at the ends of the vehicle connected to said chambers to supply sealing air curtains to the ends of the space between the vehicle and the track means.

10. A transporting apparatus according to claim 9 in which said chambers are dependent from the vehicle on the outer side of each conduit and said further valve means are in the outer side of each conduit.

11. A transporting apparatus according to claim 9 in which the first mentioned valve means are distributed along said conduits in spaced relation and said further valve means are staggered relative thereto.

12. A transporting apparatus according to claim 11 in which each conduit has an upwardly facing flat top wall in which the first mentioned valve means are disposed and to which the first mentioned cams are opposed, each conduit also having an outwardly facing flat side wall in which said further valve means are disposed and to which said further cams are opposed, said cams adapted for load bearing engagement with the respective opposed conduit walls.

13. A transporting apparatus according to claim 7 in which each conduit is rectangular with the top walls in substantially the same lateral plane.

14. A transporting apparatus according to claim 1 which includes brake element means carried by the vehicle, said brake element means comprises brake elements on opposite sides of said conduit means and operable when urged toward each other to engage opposite sides of said conduit means.

15. A transporting apparatus according to claim 1 in which said means on the vehicle for opening the valve means includes magnet means and magnetically responsive means associated with the valve means for opening the valve means when the vehicle is within the range thereof.

16. In a transporting apparatus; track means, conduit means extending longitudinally along the track means and protruding upwardly, said conduit means being adapted to be supplied with air under pressure, laterally spaced rows of valves distributed along the length of said conduit means and normally closed, a vehicle adapted to run along said track means and having a duct opening downwardly and embracing said conduit, said vehicle laterally of said conduit confining spaces with said track means, said valves adapted to communicate with said duct and therethrough with said spaces, said vehicle having a downwardly facing surface closing the top of said spaces, means on the vehicle for causing the valves which are within the longitudinal range of said spaces to open whereby compressed air in said conduit means flows into said duct and therefrom into said spaces and supplies lifting force to the vehicle, a rail extending along said track means, an air motor on the vehicle receiving air from said conduit means via said valves, a wheel driven by said motor and engaging said rail for propelling said vehicle, and means for supplying air under pressure to said conduit means.

17. A transporting apparatus according to claim 16 in which said wheel is a friction wheel and frictionally engages said rail.

18. The method of supporting and driving a vehicle along a predetermined path which comprises; confining the vehicle to the said path by track means which includes longitudinally coextensive conduit means, supplying air under pressure to the conduit means, releasing air from the conduit means to the space beneath the vehicle for developing lift on the vehicle by the vehicle, directing a jet of the said air from the conduit means rearwardly from the vehicle to develop forward thrust on the vehicle, and supplying air released from said conduit means to air curtain seals at the ends of the space beneath said vehicle at the ends of the vehicle.

* * * * *